United States Patent
Zhang et al.

(10) Patent No.: US 12,430,381 B1
(45) Date of Patent: Sep. 30, 2025

(54) MULTI-MODALITY BASED BUILDING IMAGE RETRIEVAL METHOD, DEVICE AND APPARATUS

(71) Applicant: Tsinghua University Architectural Design and Research Institute Co., Ltd, Beijing (CN)

(72) Inventors: Rongbo Zhang, Beijing (CN); Zhaoqun Cui, Beijing (CN); Peng Wang, Beijing (CN)

(73) Assignee: Tsinghua University Architectural Design and Research Institute Co., Ltd, Beijing (CN)

( * ) Notice: Subject to any disclaimer, the term of this patent is extended or adjusted under 35 U.S.C. 154(b) by 0 days.

(21) Appl. No.: 19/031,759

(22) Filed: Jan. 18, 2025

(30) Foreign Application Priority Data

Mar. 29, 2024 (CN) .......................... 202410377769.9

(51) Int. Cl.
*G06F 16/583* (2019.01)
*G06V 10/75* (2022.01)
*G06V 10/77* (2022.01)

(52) U.S. Cl.
CPC ............ *G06F 16/583* (2019.01); *G06V 10/75* (2022.01); *G06V 10/7715* (2022.01)

(58) Field of Classification Search
None
See application file for complete search history.

(56) References Cited

U.S. PATENT DOCUMENTS

| | | | |
|---|---|---|---|
| 9,218,366 B1* | 12/2015 | Li | G06F 16/583 |
| 12,182,678 B1* | 12/2024 | Poulis | G06N 3/045 |
| 12,205,309 B2* | 1/2025 | Blonder | G06T 5/50 |
| 2023/0262293 A1* | 8/2023 | Barbieri | H04N 21/47205 |
| | | | 715/716 |
| 2024/0086460 A1* | 3/2024 | Ben Shaul | G16H 30/40 |
| 2024/0303272 A1* | 9/2024 | Mao | G06V 20/70 |
| 2025/0005049 A1* | 1/2025 | Chaturvedi | G06F 16/3323 |

FOREIGN PATENT DOCUMENTS

CN 117332113 A 1/2024

\* cited by examiner

*Primary Examiner* — Giuseppi Giuliani

(57) ABSTRACT

The present application provides a multi-modality based building image retrieval method, device and apparatus. The method includes the steps of: acquiring a building example image set, a positive prompt word set, and a negative prompt word set inputted by a user; extracting features from the building example image set, the positive prompt word set and the negative prompt word set, and calculating a mean image feature, a mean positive feature, and a mean negative feature; and calculating correlations between the building example image set and various building images in a building image library according to the mean image feature, the mean positive feature, and the mean negative feature. In the present application, image retrieval is performed using data of text and image modalities, and the obtained target images have a high correlation with building example images, requiring no manual screening, and further enhancing work efficiency.

11 Claims, 2 Drawing Sheets

MULTI-MODALITY BASED BUILDING IMAGE RETRIEVAL METHOD, DEVICE AND APPARATUS

CROSS-REFERENCE TO RELATED APPLICATION

This application claims priority of Chinese Patent Application No. 202410377769.9, filed on Mar. 29, 2024, the entire contents of which are incorporated herein by reference.

TECHNICAL FIELD

The present application relates to the technical field of cross-modal retrieval, and more specifically relates to a multi-modality based building image retrieval method, device and apparatus.

BACKGROUND

For an image generation task in a specific field, a general image generation model is required to realize orientated adaptation of specific data distribution in the field. However, currently, large models with strong capabilities and over billions of parameters typically bring huge costs in fine-tuning to adapt to downstream tasks. In response to this problem, a low-rank adaptation (LoRA) method is generally applied, which can freeze the weights of the pre-trained image generation model and inject trainable layers into each embedding layer of each deep model for fine-tuning, requiring no calculation of gradients for the weights of model, thereby significantly reducing the number of parameters that need to be trained and lowering requirements for memory of graphics processing unit (GPU).

At present, the LoRA method is also widely applied in the building effect image generation tasks in the field of building design. By means of text-image or image-image retrieval method, users need to search for building images of the same type with the current building in the internet according to the building design sketch of the current building. However, due to the low correlation of the images searched from the internet with the current building, users need to select building images of the same type with relatively high correlation from the searched building images of the same type, as the image data used for the LoRA method. Existing building image retrieval methods rely solely on text or image, which result in low correlation between the retrieved building images of the same type and the current building, requiring further manual screening, and leading to a low work efficiency.

SUMMARY

Given that, the present application provides a multi-modality based building image retrieval method, device and apparatus, to solve the problem that the existing building image retrieval methods rely solely on text or image, which result in low correlation between the retrieved similar building images of the same type and the current building, requiring further manual screening, and leading to a low work efficiency.

To realize the above objective, the following solutions are provided.

A multi-modality based building image retrieval method includes:
acquiring a building example image set, a positive prompt word set, and a negative prompt word set inputted by a user;
extracting features from the building example image set by a vision transformer (ViT) image encoder in a contrastive language-image pre-training (CLIP) model, to obtain an image feature set, and calculating a mean image feature of the image feature set;
extracting features from the positive prompt word set and the negative prompt word set by a bidirectional encoder representations from transformers (BERT) text encoder in the CLIP model, to obtain a positive feature set and a negative feature set, and calculating a mean positive feature of the positive feature set and a mean negative feature of the negative feature set;
calculating correlations between the building example image set and various building images in a building image library according to the mean image feature, the mean positive feature, and the mean negative feature;
sorting the correlations in descending order; and
selecting top N building images in terms of correlation as target building images, N being a positive integer.

Preferably, before the calculating correlations between the building example image set and various building images in a building image library according to the mean image feature, the mean positive feature, and the mean negative feature, the following is further included:
extracting image features from various building images in the building image library by the ViT image encoder in the CLIP model, to obtain image feature vectors of the various building images; and
extracting text features from the various building images in the building image library by the BERT text encoder in the CLIP model, to obtain text feature vectors of the various building images.

Preferably, the calculating correlations between the building example image set and various building images in a building image library according to the mean image feature, the mean positive feature, and the mean negative feature includes:
calculating correlations between the building example image set and the various building images in the building image library according to rel(Q, v)=$\alpha I_v^T I_p + \beta T_v^T T_q - \gamma T_v^T S_b$, where Q represents query conditions, v represents building images, $I_v$ represents image feature vectors of the building images, $T_v$ represents text feature vectors of the building images, $I_v^T$ and $T_v^T$ are transposes of $I_v$ and $T_v$, respectively, $I_p$ represents a mean image feature, $T_q$ represents a mean positive feature, $S_b$ represents a mean negative feature, and $\alpha$, $\beta$, and $\gamma$ are manually set hyperparameters.

Preferably, the following is further included:
concatenating the image feature vectors and the text feature vectors corresponding to the various building images in the building image library, to obtain an overall representation vector of the various building images.

Preferably, the following is further included:
concatenating the mean image feature, the mean positive feature, and the mean negative feature to obtain a query representation vector.

Preferably, after the calculating correlations between the building example image set and various building images in a building image library according to the mean image feature, the mean positive feature, and the mean negative feature, the following is further included:

performing retrieval based on the overall representation vector of the various building images using an approximate nearest neighbor (ANN) indexing algorithm, to obtain an initial building image set.

Preferably, the calculating correlations between the building example image set and various building images in a building image library according to the mean image feature, the mean positive feature, and the mean negative feature includes:

calculating the correlations between the building example image set and various building images in the initial building image set according to $rel(Q, v) = E_v^T E_Q$, where Q represents query conditions, v represents building images, $E_Q$ represents a query representation vector, $E_Q = [\alpha I_p; \beta T_q; -\gamma S_b]$, $I_p$ represents a mean image feature, $T_q$ represents a mean positive feature, $S_b$ represents a mean negative feature, $\alpha$, $\beta$, and $\gamma$ are manually set hyperparameters, $E_v^T$ is a transpose of $E_v$, and $E_v$ represents an overall representation vector of various building images.

A multi-modality based building image retrieval device includes:

a condition acquisition unit, configured to acquire a building example image set, a positive prompt word set, and a negative prompt word set inputted by a user;

an image feature extraction unit, configured to extract features from the building example image set by a ViT image encoder in a CLIP model, to obtain an image feature set, and calculate a mean image feature of the image feature set;

a text feature extraction unit, configured to extract features from the positive prompt word set and the negative prompt word set by a BERT text encoder in the CLIP model, to obtain a positive feature set and a negative feature set, and calculate a mean positive feature of the positive feature set and a mean negative feature of the negative feature set;

a correlation calculation unit, configured to calculate correlations between the building example image set and various building images in a building image library according to the mean image feature, the mean positive feature, and the mean negative feature;

a sort unit, configured to sort the correlations in descending order; and an image determination unit, configured to select top N building images in terms of correlation as target building images.

A multi-modality based building image retrieval apparatus includes a memory and a processor;

the memory being configured to store programs; and the processor being configured to execute the programs, and implement various steps of the multi-modality based building image retrieval method described above.

From the above mentioned technical solutions, it can be seen that, according to the multi-modality based building image retrieval method provided in the present application, the building example image set, the positive prompt word set, and the negative prompt word set inputted by a user can be acquired; features are extracted from the building example image set to obtain the image feature set, and the mean image feature of the image feature set is calculated; features are extracted from the positive prompt word set and the negative prompt word set to obtain the positive feature set and the negative feature set, and the mean positive feature and the mean negative feature are calculated; and according to the mean image feature, the mean positive feature, and the mean negative feature, correlations between building example images in the building example image set and the various building images in the building image library are calculated. According to the building image retrieval method provided in the present application, image retrieval is performed based on data of text and image modalities, correlations between building example images and various building images in the building image library are calculated according to text features and image features, and the top N building images in terms of correlation are selected as target images for a LoRA method. The obtained target images have a high correlation with the building example images, requiring no manual screening, and further enhancing work efficiency.

BRIEF DESCRIPTION OF THE DRAWINGS

To state the technical solutions of the examples in the present application or the prior art clearer, the attached drawings needed in the examples or prior art are introduced briefly below. Obviously, the drawings described below are some examples in the present application, and for those ordinary skilled in the art, other drawings can be obtained according to these drawings without creative efforts.

DETAILED DESCRIPTION

The technical solutions of the examples in the present application will be described clearly and completely by reference to the attached drawings of the examples in the present application below. Obviously, the examples described are only some, rather than all examples of the present application. On the basis of the examples of the present application, all other examples obtained by those ordinary skilled in the art without creative efforts fall within the scope of protection of the present application.

Figure 1:
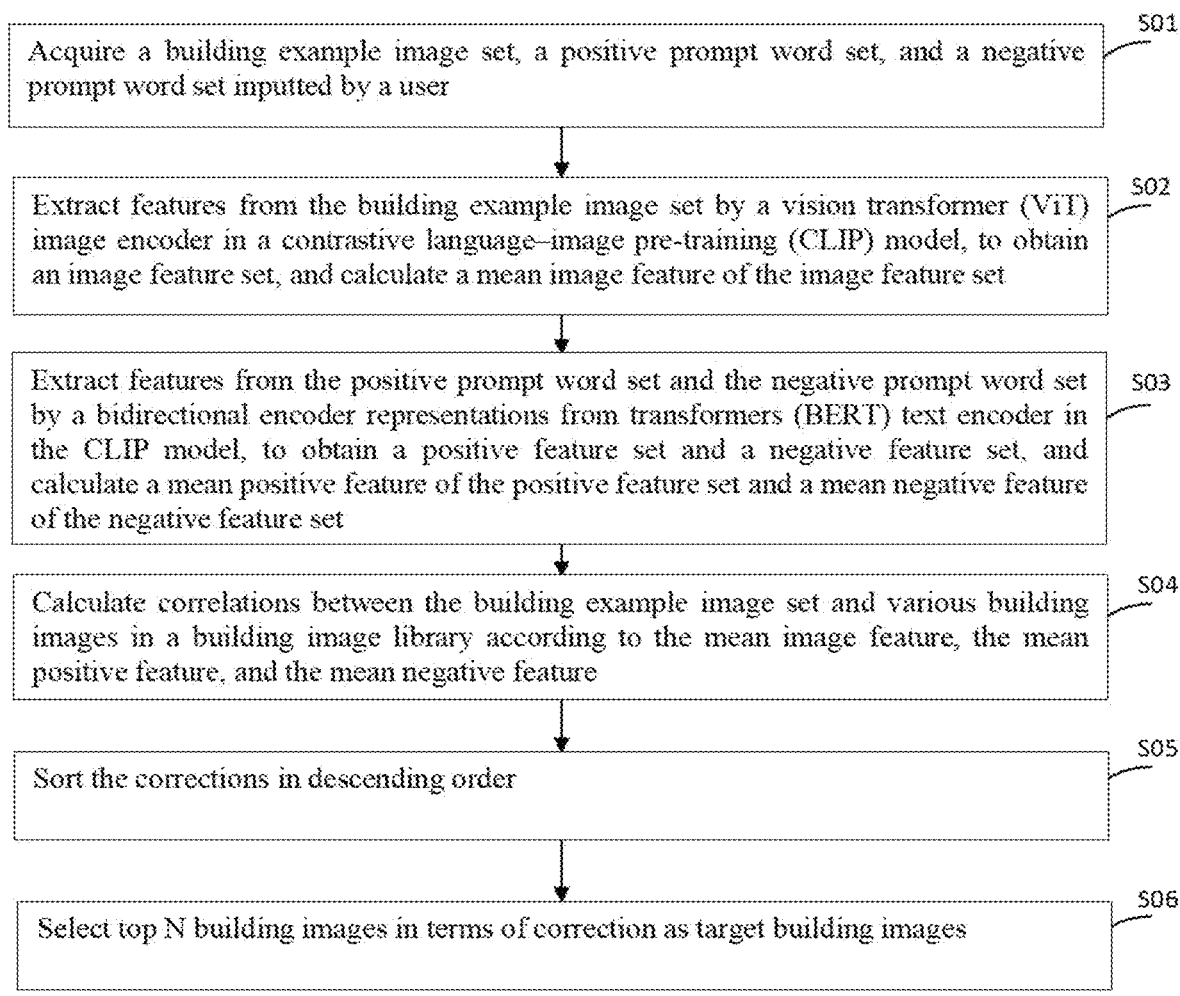
FIG. 1 is a flow chart of a multi-modality based building image retrieval method according to an example of the present application.

Referring to FIG. 1, a multi-modality based building image retrieval method provided in an example of the present application may include the following steps.

Step S01, a building example image set, a positive prompt word set, and a negative prompt word set inputted by a user are acquired.

Specifically, the user can input the building example image set, the positive prompt word set, and the negative prompt word set for retrieval. The building example image set includes n building example images $p_1, p_2 \ldots p_n$ inputted by the user. The positive prompt word set includes m positive prompt words inputted by the user. The negative prompt word set includes k negative prompt words inputted by the user. n, m and k are integers greater than or equal to 0, respectively.

Step S02, features are extracted from the building example image set by a ViT image encoder in a CLIP model, to obtain an image feature set, and a mean image feature of the image feature set is calculated.

Specifically, the ViT image encoder in the pre-trained CLIP model is employed to extract features from the building example images, to obtain image features of various building example images, thereby obtaining the image feature set. The image feature set includes $I_{p_1}, I_{p_2}, \ldots, I_{p_n}$. A mean value of various feature vectors in the image feature set is calculated to obtain a mean image feature $I_p$, where $$I_p = \left(\sum_{i=1}^{n} I_{p_i}\right)/n.$$

The mean image feature $I_p$ is taken as the unified representation of the image modality for the building example image set inputted by the user.

The CLIP model is obtained through training, with a plurality of image-text data pairs as a training set, and with image feature vectors and text feature vectors as training labels.

Step S03, features are extracted from the positive prompt word set and the negative prompt word set by a BERT text encoder in the CLIP model, to obtain a positive feature set and a negative feature set, and a mean positive feature of the positive feature set and a mean negative feature of the negative feature set are calculated.

Specifically, the BERT text encoder in the pre-trained CLIP model is employed to extract features from the positive prompt word set and the negative prompt word set inputted by the user, and extract text features form the positive prompt word set and the negative prompt word set, to obtain the positive feature set of the positive prompt word set and the negative feature set of the negative prompt word set. The positive feature set includes $T_{q_1}, T_{q_2}, \ldots, T_{q_m}$, and the negative feature set includes $S_{b_1}, S_{b_2}, \ldots, S_{b_k}$. The mean positive feature $T_q$ of the positive feature set is calculated according to $$T_q = \left(\sum_{i=1}^{m} T_{q_i}\right)/m,$$

and the mean negative feature $S_b$ of the negative feature set is calculated according to $$S_b = \left(\sum_{i=1}^{k} S_{b_i}\right)/k.$$

Step S04, correlations between the building example image set and various building images in a building image library are calculated according to the mean image feature, the mean positive feature, and the mean negative feature.

Specifically, the correlations between the building example image set and the various building images in the building image library can be calculated according to the mean image feature of the building example image set, the mean positive feature and the mean negative feature, as well as the image feature vectors and text feature vectors of the various building image pre-inputted in the building image library.

Step S05, the correlations are sorted in descending order.

Specifically, the correlations are sorted in descending order. A higher correlation corresponding to the building image indicates a higher correlation between this building image and the building example image set inputted by the user. A higher correlation with the positive prompt word set, and a lower correlation with the negative prompt word set.

Step S06, top N building images in terms of correlation are selected as target building images.

Specifically, top N building images in terms of correlation can be selected as target building images, N being a positive integer.

According to the multi-modality based building image retrieval method provided in the example of the present application, the building example image set, the positive prompt word set, and the negative prompt word set inputted by a user can be acquired; features are extracted from the building example image set to obtain the image feature set, and the mean image feature of the image feature set is calculated; features are extracted from the positive prompt word set and the negative prompt word set to obtain the positive feature set and the negative feature set, and the mean positive feature and the mean negative feature are calculated; according to the mean image feature, the mean positive feature, and the mean negative feature, correlations between various building example images in the building example image set and various building images in the building image library are calculated, to obtain a correlation set; the correlations are sorted in descending order; and the top N building images in terms of correlation are selected as target building images. According to the building image retrieval method provided in the example of the present application, image retrieval is performed based on data of text and image modalities, correlations between building example images and various building images in the building image library are calculated according to text features and image features, and the top N building images in terms of correlation are selected as target images for a LoRA method. The obtained target images have a high correlation with the building example images, requiring no manual screening, and further enhancing work efficiency.

In step S04, before calculating correlations between the building example image set and various building images in a building image library according to the mean image feature, the mean positive feature, and the mean negative feature, and after inputting building images in the building image library in the example of the present application, the following steps can be executed.

Image features are extracted from the various building images in the building image library by the ViT image encoder in the CLIP model, to obtain image feature vectors of the various building images.

Specifically, the ViT image encoder in the pre-trained CLIP model is employed to extract image features from the various building images inputted in the building image library, to obtain image feature vectors $I_v$ of the various building images.

Text features are extracted from the various building images in the building image library by the BERT text encoder in the CLIP model, to obtain text feature vectors of the various building images.

Specifically, a text label set $\Pi_v$ of the various building images in the building image library can be first generated using a Deepbooru model. Subsequently, the BERT text encoder in the pre-trained CLIP model is employed to extract text features from the text label set $\Pi_v$, to obtain the text feature vectors $T_v$ of the various building images.

Based on this, step S04, a process of calculating correlations between the building example image set and various building images in a building image library according to the mean image feature, the mean positive feature, and the mean negative feature may include the following content.

According to $rel(Q, v) = \alpha I_v^T I_p + \beta T_v^T T_q - \gamma T_v^T S_b$, the correlations between the building example image set and various building images in the building image database is calculated. Q represents query conditions, v represents building images, $I_v$ represents image feature vectors of the building images, $T_v$ represents text feature vectors of the building images, $I_v^T$ and $T_v^T$ represent transposes of $I_v$ and $T_v$, respectively, $I_p$ represents a mean image feature, $T_q$ represents a mean positive feature, $S_b$ represents a mean negative feature, and α, β, and γ represent manually set hyperparameters. The query conditions Q include a mean image feature, a mean positive feature, and a mean negative feature, $Q=(I_p, T_q, S_b)$.

According to the multi-modality based building image retrieval method provided by the example of the present application, the correlations of various building images are calculated according to the features from both the image and text modalities of the various building images in the building example image set and the building image library. The calculated correlation is more accurate.

Considering the large scale of the building image library, the large number of building images within the building image library, and the higher complexity of traversing the entire building image library, the example of the present application provides a multi-modality based building image retrieval method. After obtaining the image feature vectors and text feature vectors of the building images, the following steps can be executed.

The image feature vectors and the text feature vectors corresponding to the various building images in the building image library are concatenated, to obtain an overall representation vector of the various building images.

Specifically, after extracting the image feature vectors and the text feature vectors corresponding to the various building images in the building image by the CLIP model, the image feature vectors and the text feature vectors corresponding to the various building images can be concatenated, to obtain an overall representation vector $E_v$ corresponding to the various building images, where $E_v=[I_v; T_v]$. The overall representation vector can serve as an index for retrieving the building image corresponding to the overall representation vector.

The mean image feature, the mean positive feature, and the mean negative feature are concatenated to obtain a query representation vector.

Specifically, after extracting the features from the building example image set, the positive prompt word set, and the negative prompt word set using the CLIP model, the mean image feature, the mean positive feature, and the mean negative feature can be concatenated to obtain a query representation vector $E_Q$. $E_Q=[\alpha I_p; \beta T_q; -\gamma S_b]$, where α, β, and γ represent manually set hyperparameters.

Retrieval is performed based on the overall representation vector of the various building images using an ANN indexing algorithm, to obtain an initial building image set.

Specifically, the ANN indexing algorithm can be employed to accelerate the vector retrieval process.

Based on this, step S04, a process of calculating correlations between the building example image set and various building images in a building image library according to the mean image feature, the mean positive feature, and the mean negative feature may include the following content.

According to $rel(Q, v)=E_v^T E_Q$, the correlations between various building images in the building example image set and in the initial building image set are calculated. Q represents query conditions, v represents building images, $E_Q$ represents a query representation vector, $E_v^T$ represents a transpose of $E_v$, and $E_v$ represents an overall representation vector of various building images.

According to the multi-modality building image retrieval method provided in the example of the present application, the calculation of the correlation between the image v and the overall query conditions $Q=(I_p, T_q, S_b)$ is transformed into the calculation of the inner product between $E_v$ and $E_Q$, and the vector retrieval process based on the inner product is accelerated using the ANN indexing algorithm. At this point, if the number of building images in the building image library is A, the computational complexity can be reduced from O(A) to O(log A).

A multi-modality building image retrieval device provided in the example of the present application is described below. The multi-modality building image retrieval device described below can be referenced in conjunction with the multi-modality building image retrieval method described above.

Figure 2:
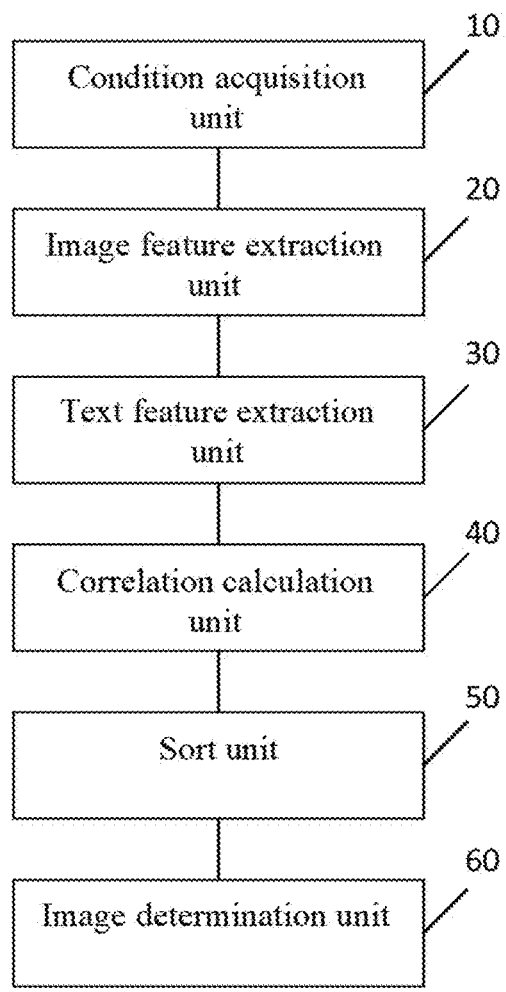
FIG. 2 is a schematic structural diagram of a multi-modality based building image retrieval device according to an example of the present application.

Referring to FIG. 2, the multi-modality building image retrieval device is introduced. As shown in FIG. 2, the multi-modality building image retrieval device may include:
a condition acquisition unit 10, configured to acquire a building example image set, a positive prompt word set, and a negative prompt word set inputted by a user;
an image feature extraction unit 20, configured to extract features from the building example image set by a ViT image encoder in a CLIP model, to obtain an image feature set, and calculate a mean image feature of the image feature set;
a text feature extraction unit 30, configured to extract features from the positive prompt word set and the negative prompt word set by a BERT text encoder in the CLIP model, to obtain a positive feature set and a negative feature set, and calculate a mean positive feature of the positive feature set and a mean negative feature of the negative feature set;
a correlation calculation unit 40, configured to calculate correlations between the building example image set and various building images in a building image library according to the mean image feature, the mean positive feature, and the mean negative feature;
a sort unit 50, configured to sort the correlations in descending order; and
an image determination unit 60, configured to select top N building images in terms of correlation as target building images.

Figure 3:
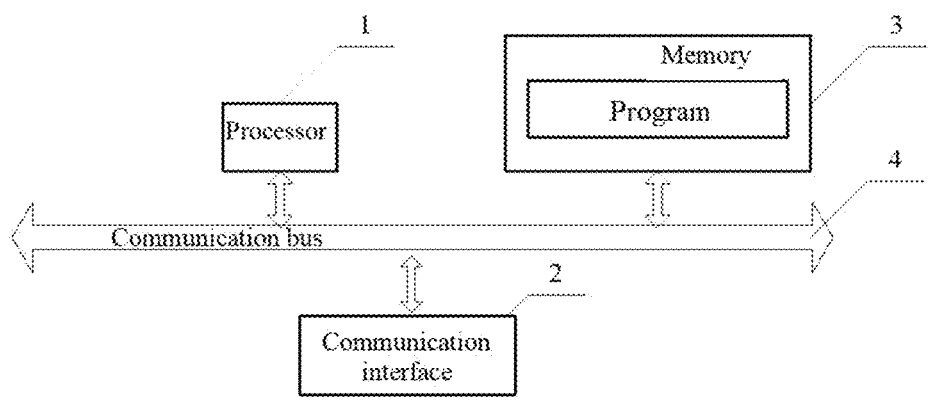
FIG. 3 is a block diagram of a hardware structure for a multi-modality based building image retrieval apparatus according to an example of the present application.

The multi-modal building image retrieval device provided in the example of the present application can be applied to a multi-modal building image retrieval apparatus. FIG. 3 illustrates a block diagram of a hardware structure of a multi-modality building image retrieval apparatus. Referring to FIG. 3, the hardware structure of the apparatus may include: at least one processor 1, at least one communication interface 2, at least one memory 3, and at least one communication bus 4.

In the example of the present application, the number of processors 1, communication interfaces 2, memories 3, and communication buses 4 is at least one, and the processor 1, the communication interface 2, and the memory 3 communicate with each other through the communication bus 4.

The processor 1 may be a central processing unit (CPU), an application specific integrated circuit (ASIC), or one or more integrated circuits configured to implement the example of the present disclosure.

The memory 3 may include a high-speed random access memory (RAM), and may also include a non-volatile memory, such as at least one disk storage device.

The memory stores programs, and the processor can invoke the programs stored in the memory. The programs are configured to implement the various processing flows in the above mentioned multi-modality building image retrieval solutions.

The example of the present application further provides a storage medium, which can store programs suitable for execution by a processor. The programs are configured to implement the various processing flows in the above mentioned multi-modality building image retrieval solutions.

Finally, it is to be noted that, herein, the relation terms such as first and second are merely used for distinguishing one entity or operation from another entity or operation, rather than necessarily demanding or implying the existence of any such actual relationship or order between these entities or operations. Moreover, terms "include", "contain" or any other variations thereof are intended to cover non-exclusive inclusions, so that a process, a method, an object or an apparatus that includes a series of elements may include not only those elements, but also other elements not expressly listed, or also includes elements inherent to the process, method, object or apparatus. In the absence of more limitations, the element defined by a sentence "including a . . . " is not excluded that there are other identical elements in the process, method, article or apparatus including the element.

The various examples in the specification are described in a progressive approach, with each example focusing on the differences from other examples. The same or similar parts among the various examples can be referred to each other.

The foregoing description of the disclosed examples enables a person skilled in the art to realize or use the present application. Various modifications to these examples will be apparent to those skilled in the art, and the general principles defined herein may be realized in other examples without departing from the spirit or scope of the present application. Accordingly, the present application will not be limited to these examples shown herein, but will be subjected to the broadest scope consistent with the principles and novel features disclosed herein.

The invention claimed is:

1. A multi-modality based building image retrieval method, comprising:
   acquiring a building example image set, a positive prompt word set, and a negative prompt word set inputted by a user,
   extracting features from the building example image set by a vision transformer (ViT) image encoder in a contrastive language-image pre-training (CLIP) model, to obtain an image feature set, and calculating a mean image feature of the image feature set,
   extracting features from the positive prompt word set and the negative prompt word set by a bidirectional encoder representations from transformers (BERT) text encoder in the CLIP model, to obtain a positive feature set and a negative feature set, and calculating a mean positive feature of the positive feature set and a mean negative feature of the negative feature set,
   calculating correlations between the building example image set and building images in a building image library according to the mean image feature, the mean positive feature, and the mean negative feature,
   sorting the correlations in descending order, and
   selecting top N building images in terms of correlation as target building images, N being a positive integer, wherein
   before the calculating correlations between the building example image set and building images in a building image library according to the mean image feature, the mean positive feature, and the mean negative feature, the following is further comprised:
   extracting image features from the building images in the building image library by the ViT image encoder in the CLIP model, to obtain image feature vectors of the building images; and
   extracting text features from the building images in the building image library by the BERT text encoder in the CLIP model, to obtain text feature vectors of the building images; and
   a process of the calculating correlations between the building example image set and building images in a building image library according to the mean image feature, the mean positive feature, and the mean negative feature comprises:
   calculating the correlations between the building example image set and the building images in the building image library according to $\text{rel}(Q, v) = \alpha I_v^T I_p + \beta T_v^T T_q - \gamma T_v^T S_b$, where Q represents query conditions, v represents building images in a building image library, $I_v$ represents image feature vectors of the building images, $T_v$ represents text feature vectors of the building images, $I_v^T$ and $T_v^T$ represent transposes of $I_v$ and $T_v$, respectively, $I_p$ represents a mean image feature, $T_q$ represents a mean positive feature, $S_b$ represents a mean negative feature, and $\alpha$, $\beta$, and $\gamma$ are manually set hyperparameters, the query conditions Q comprising a mean image feature, a mean positive feature, and a mean negative feature of the building example image set, $Q = (I_p, T_q, Sp)$.

2. The multi-modality based building image retrieval method according to claim 1, further comprising:
   concatenating the image feature vectors and the text feature vectors corresponding to the building images in the building image library, to obtain an overall representation vector of the building images.

3. The multi-modality based building image retrieval method according to claim 2, further comprising:
   concatenating the mean image feature, the mean positive feature, and the mean negative feature to obtain a query representation vector.

4. The multi-modality based building image retrieval method according to claim 3, wherein after the calculating correlations between the building example image set and building images in a building image library according to the mean image feature, the mean positive feature, and the mean negative feature, the following is further comprised:
   performing retrieval based on the overall representation vector of the building images using an approximate nearest neighbor (ANN) indexing algorithm, to obtain an initial building image set.

5. The multi-modality based building image retrieval method according to claim 4, wherein the calculating correlations between the building example image set and building images in a building image library according to the mean image feature, the mean positive feature, and the mean negative feature comprises:
   calculating correlations between the building example image set and building images in the initial building image set according to $\text{rel}(Q, v) = E_v^T E_Q$, where Q represents query conditions, v represents building images, $E_Q$ represents a query representation vector, $E_Q = [\alpha I_p; \beta T_q; -\gamma S_b]$, $I_p$ represents a mean image feature, $T_q$ represents a mean positive feature, $S_b$ represents a mean negative feature, $\alpha$, $\beta$, and $\gamma$ are manually set hyperparameters, $E_v^T$ represents a transpose of $E_v$, and $E_v$ represents an overall representation vector of building images.

6. A multi-modality based building image retrieval device, employing a multi-modality based building image retrieval method, the retrieval device comprising:
   a condition acquisition unit, configured to acquire a building example image set, a positive prompt word set, and a negative prompt word set inputted by a user;
   an image feature extraction unit, configured to extract features from the building example image set by a ViT image encoder in a CLIP model, to obtain an image feature set, and calculate a mean image feature of the image feature set;
   a text feature extraction unit, configured to extract features from the positive prompt word set and the negative prompt word set by a BERT text encoder in the CLIP model, to obtain a positive feature set and a negative feature set, and calculate a mean positive feature of the positive feature set and a mean negative feature of the negative feature set;
   a correlation calculation unit, configured to calculate correlations between the building example image set and building images in a building image library according to the mean image feature, the mean positive feature, and the mean negative feature;
   a sort unit, configured to sort the correlations in descending order; and
   an image determination unit, configured to select top N building images in terms of correlation as target building images,
   wherein the image feature extraction unit is further configured to extract image features from the building images in the building image library by the ViT image encoder in the CLIP model, to obtain image feature vectors of the building images,
   the text feature extraction unit is further configured to extract text features from the building images in the building image library by the BERT text encoder in the CLIP model, to obtain text feature vectors of the building images, and
   the correlation calculation unit is further configured to: calculate the correlations between the building example image set and the building images in the building image library according to $\text{rel}(Q, v) = \alpha I_v^T I_p + \beta T_v^T T_q - \gamma T_v^T S_b$, where Q represents query conditions, v represents building images in a building image library, $I_v$ represents image feature vectors of the building images, $T_v$ represents text feature vectors of the building images, $I_v^T$ and $T_v^T$ represent transposes of $I_v$ and $T_v$, respectively, $I_p$ represents a mean image feature, $T_q$ represents a mean positive feature, $S_b$ represents a mean negative feature, and $\alpha$, $\beta$, and $\gamma$ are manually set hyperparameters, the query conditions Q comprising a mean image feature, a mean positive feature, and a mean negative feature of the building example image set, $Q=(I_p, T_q, S_b)$.

7. A multi-modality based building image retrieval apparatus,
   comprising a memory and a processor;
   the memory being configured to store programs; and
   the processor being configured to execute the stored programs, and implement a multi-modality based building image retrieval method, comprising:
   acquiring a building example image set, a positive prompt word set, and a negative prompt word set inputted by a user,
   extracting features from the building example image set by a vision transformer (ViT) image encoder in a contrastive language-image pre-training (CLIP) model, to obtain an image feature set, and calculating a mean image feature of the image feature set,
   extracting features from the positive prompt word set and the negative prompt word set by a bidirectional encoder representations from transformers (BERT) text encoder in the CLIP model, to obtain a positive feature set and a negative feature set, and calculating a mean positive feature of the positive feature set and a mean negative feature of the negative feature set,
   calculating correlations between the building example image set and building images in a building image library according to the mean image feature, the mean positive feature, and the mean negative feature,
   sorting the correlations in descending order, and
   selecting top N building images in terms of correlation as target building images, N being a positive integer, wherein
   before the calculating correlations between the building example image set and building images in a building image library according to the mean image feature, the mean positive feature, and the mean negative feature, the following is further comprised:
   extracting image features from the building images in the building image library by the ViT image encoder in the CLIP model, to obtain image feature vectors of the building images; and
   extracting text features from the building images in the building image library by the BERT text encoder in the CLIP model, to obtain text feature vectors of the building images; and
   a process of the calculating correlations between the building example image set and building images in a building image library according to the mean image feature, the mean positive feature, and the mean negative feature comprises:
   calculating the correlations between the building example image set and the building images in the building image library according to $\text{rel}(Q, v) = \alpha I_v^T I_p + \beta T_v^T T_q - \gamma T_v^T S_b$, where Q represents query conditions, v represents building images in a building image library, $I_v$ represents image feature vectors of the building images, $T_v$ represents text feature vectors of the building images, $I_v^T$ and $T_v^T$ represent transposes of $I_v$ and $T_v$, respectively, $I_p$ represents a mean image feature, $T_q$ represents a mean positive feature, $S_b$ represents a mean negative feature, and $\alpha$, $\beta$, and $\gamma$ are manually set hyperparameters, the query conditions Q comprising a mean image feature, a mean positive feature, and a mean negative feature of the building example image set, $Q=(I_p, T_q, S_b)$.

8. The multi-modality based building image retrieval apparatus according to claim 7, wherein the multi-modality based building image retrieval method further comprises:
   concatenating the image feature vectors and the text feature vectors corresponding to the building images in the building image library, to obtain an overall representation vector of the building images.

9. The multi-modality based building image retrieval apparatus according to claim 8, wherein the multi-modality based building image retrieval method further comprises:
   concatenating the mean image feature, the mean positive feature, and the mean negative feature to obtain a query representation vector.

10. The multi-modality based building image retrieval apparatus according to claim 9, wherein after the calculating correlations between the building example image set and building images in a building image library according to the mean image feature, the mean positive feature, and the mean negative feature, the multi-modality based building image retrieval method further comprises:
  performing retrieval based on the overall representation vector of the building images using an approximate nearest neighbor (ANN) indexing algorithm, to obtain an initial building image set.

11. The multi-modality based building image retrieval apparatus according to claim 10, wherein the calculating correlations between the building example image set and building images in a building image library according to the mean image feature, the mean positive feature, and the mean negative feature comprises:
  calculating correlations between the building example image set and building images in the initial building image set according to $rel(Q, v) = E_v^T E_Q$, where Q represents query conditions, v represents building images, $E_Q$ represents a query representation vector, $E_Q = [\alpha I_p; \beta T_q; -\gamma S_b]$, $I_p$ represents a mean image feature, $T_q$ represents a mean positive feature, $S_b$ represents a mean negative feature, $\alpha$, $\beta$, and $\gamma$ are manually set hyperparameters, $E_v^T$ represents a transpose of $E_v$, and $E_v$ represents an overall representation vector of building images.

* * * * *